United States Patent
Fujita

(10) Patent No.: US 9,838,667 B2
(45) Date of Patent: Dec. 5, 2017

(54) IMAGE PICKUP APPARATUS, IMAGE PICKUP METHOD, AND NON-TRANSITORY COMPUTER-READABLE MEDIUM

(71) Applicant: FUJIFILM Corporation, Tokyo (JP)

(72) Inventor: Koudai Fujita, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 923 days.

(21) Appl. No.: 14/228,687

(22) Filed: Mar. 28, 2014

(65) Prior Publication Data

US 2014/0210955 A1 Jul. 31, 2014

Related U.S. Application Data

(63) Continuation of application No. PCT/JP2012/073410, filed on Sep. 13, 2012.

(30) Foreign Application Priority Data

Sep. 30, 2011 (JP) .................................. 2011-217892

(51) Int. Cl.
G03B 35/08 (2006.01)
H04N 13/02 (2006.01)
G03B 17/20 (2006.01)

(52) U.S. Cl.
CPC ......... *H04N 13/0221* (2013.01); *G03B 17/20* (2013.01); *G03B 35/08* (2013.01); *H04N 13/0239* (2013.01); *H04N 13/0296* (2013.01)

(58) Field of Classification Search
CPC ........... H04N 13/0239; H04N 13/0221; H04N 13/0296; H04N 5/23293; G03B 17/20; G03B 35/08; G02B 2027/0138

See application file for complete search history.

(56) References Cited

U.S. PATENT DOCUMENTS 8,300,134 B2 * 10/2012 Suzuki ..................... G09G 5/00
348/220.1
2006/0132638 A1 * 6/2006 Saitou ................ H04N 5/23293
348/333.01

(Continued)

FOREIGN PATENT DOCUMENTS

JP 2005-167310 A 6/2005
JP 2008-205758 A 9/2008

(Continued)

OTHER PUBLICATIONS

International Search Report for PCT/JP2012/073410 dated Dec. 11, 2012.

(Continued)

*Primary Examiner* — Obafemi Sosanya
(74) *Attorney, Agent, or Firm* — Birch, Stewart, Kolasch & Birch, LLP

(57) ABSTRACT

An image pickup apparatus comprising: an image pickup unit; a display unit; a display control unit; an object image detection unit; a distance information acquisition unit; and a binocular vision suitability determination unit, wherein the display control unit displays a second guide frame of a larger size than the first guide frame on the display unit in addition to the first guide frame, and, in a case where the object image detection unit detects at least one other object image different from the object image determined to be suitable for the binocular vision by the binocular vision suitability determination unit from the second guide frame, the display control unit matches the second guide frame to the at least one other object image.

11 Claims, 15 Drawing Sheets

(56) References Cited

U.S. PATENT DOCUMENTS

| | | | |
|---|---|---|---|
| 2008/0199046 A1 | 8/2008 | Sasagawa et al. | |
| 2009/0169054 A1* | 7/2009 | Chang | G06K 9/00221 |
| | | | 382/103 |
| 2010/0097488 A1* | 4/2010 | Suzuki | G09G 5/00 |
| | | | 348/222.1 |
| 2013/0234914 A1* | 9/2013 | Fujimaki | G06F 3/011 |
| | | | 345/8 |

FOREIGN PATENT DOCUMENTS

| | | |
|---|---|---|
| JP | 2009-250987 A | 10/2009 |
| JP | 2011-033990 A | 2/2011 |
| JP | 2011-171813 A | 9/2011 |

OTHER PUBLICATIONS

Written Opinion of the International Searching Authority for PCT/JP2012/073410 dated Dec. 11, 2012.

* cited by examiner

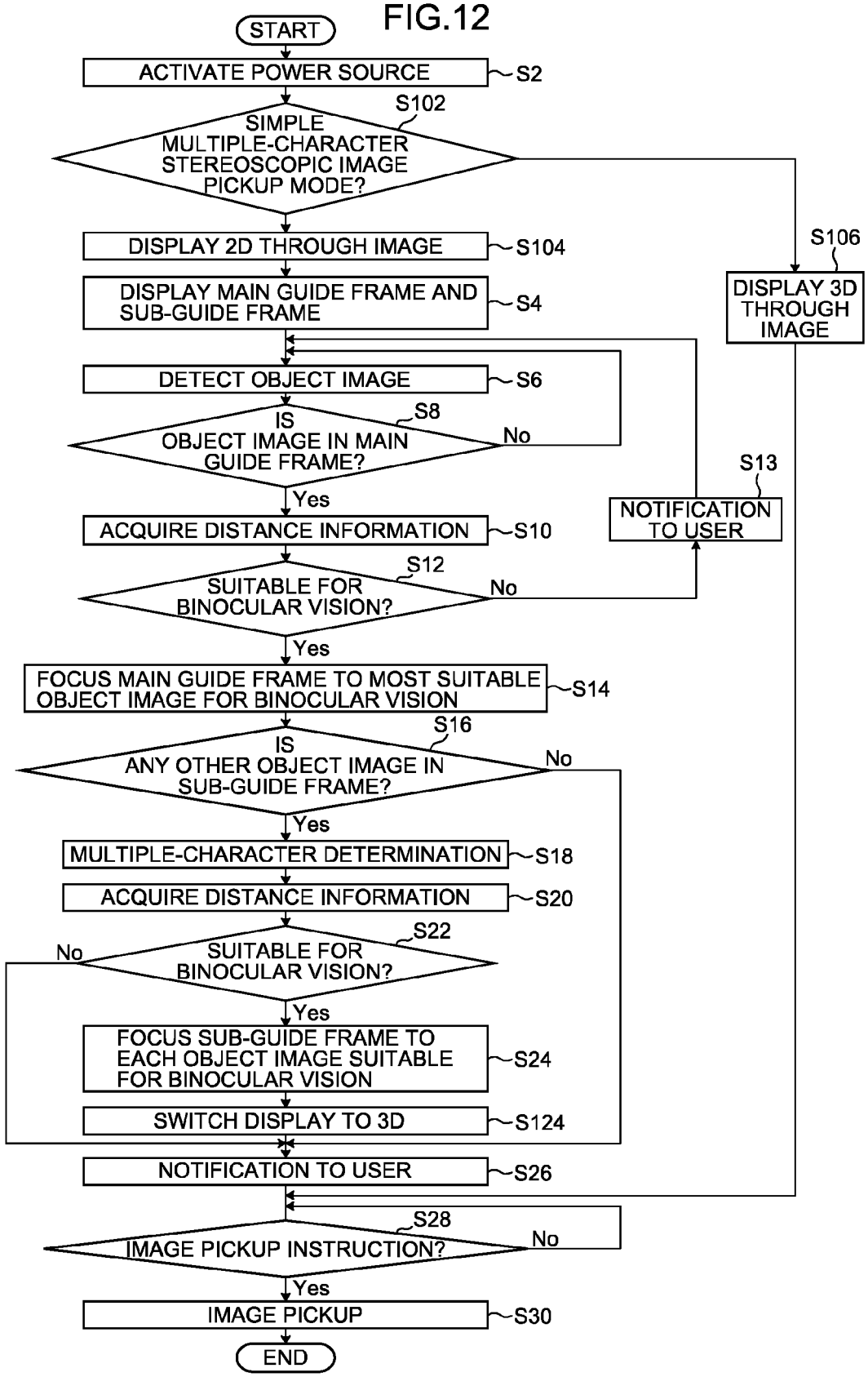

IMAGE PICKUP APPARATUS, IMAGE PICKUP METHOD, AND NON-TRANSITORY COMPUTER-READABLE MEDIUM

CROSS-REFERENCE TO RELATED APPLICATIONS

This application is a continuation application and claims the priority benefit under 35 U.S.C. §120 of PCT Application No. PCT/JP2012/073410 filed on Sep. 13, 2012 which application designates the U.S., and also claims the priority benefit under 35 U.S.C. §119 of Japanese Patent Application No. 2011-217892 filed on Sep. 30, 2011, which applications are all hereby incorporated by reference in their entireties.

BACKGROUND OF THE INVENTION

Field of the Invention

The present invention relates to an image pickup apparatus, image pickup method, and non-transitory computer-readable medium that can visually assist the user to be able to take a stereoscopic image with a proper parallax easily.

Description of the Related Art

In the case of taking right and left parallax images to perform stereoscopically visible image display, when the object is too near an image pickup apparatus, the parallax gap increases and the stereoscopic display image (3D image) is blurred. On the other hand, when the object is too far from the image pickup apparatus, there occurs a phenomenon in which the parallax gap decreases and it is not possible to acquire the stereoscopic effect.

Japanese Patent Application Laid-Open No. 2011-33990 (hereinafter referred to as Patent Literature 1) discloses a configuration to detect the object position, determine whether the object position is within a binocular vision permission range in which it is possible to take stereoscopically visible parallax images, and, in the case of determining that the object position is within the binocular vision permission range, perform imaging of the parallax images after a predetermined time.

Japanese Patent Application Laid-Open No. 2005-167310 (Patent Literature 2) discloses a configuration to determine whether images at multiple viewpoints are suitable for binocular vision, and, in the case of determining that they are not suitable for binocular vision, convert the images at multiple viewpoints into two-dimensional images.

Japanese Patent Application Laid-Open No. 2009-250987 (Patent Literature 3) discloses a configuration to overlap an eye position guide image, which shows the proper positions of the right and left eyes to make the user stereoscopically view a 3D image on a display screen, with a user image displayed on a monitor.

SUMMARY OF THE INVENTION

However, there are problems that the user does not know where to view to take an image, the user does not know in which state or scene a suitable stereoscopic image can be acquired, and the user does not know in which state or scene binocular vision is not suitable (it is unknown until imaging is performed).

In the configuration in Patent Literature 1, although it is possible to automatically take an image in a case where the object position is within the binocular vision permission range, it is not possible to visually assist the user to easily take a stereoscopic image with a proper parallax.

In the configuration in Patent Literature 2, although it is possible to output a two-dimensional image in a case where it is not suitable for binocular vision, it is not possible to visually assist the user to easily take a stereoscopic image with a proper parallax.

In the configuration in Patent Literature 3, although it is possible to lead the user's eye positions to positions suitable for binocular vision, it is not possible to visually assist the user to be able to easily take a stereoscopic image with a proper parallax.

The present invention is made in view of such a condition, and it is an object to provide an image pickup apparatus, image pickup method, and non-transitory computer-readable medium that can visually assist the user to be able to easily take a stereoscopic image with a proper parallax.

To achieve the above-mentioned object, an image pickup apparatus according to one aspect of the present invention includes: an image pickup unit configured to image an object and acquire a stereoscopic image formed with multiple viewpoint images; a display unit capable of displaying the stereoscopic image acquired by the image pickup unit; a display control unit configured to display a first guide frame of a predetermined size on the display unit; an object image detection unit configured to detect a specific object image from the stereoscopic image acquired by the image pickup unit; a distance information acquisition unit configured to acquire information which relates to a distance of an object corresponding to the object image detected by the object image detection unit and relates to a distance from the image pickup unit to the object; and a binocular vision suitability determination unit configured to determine whether the object image in the first guide frame is suitable for binocular vision, based on the information which relates to the distance acquired by the distance information acquisition unit, in which, in a case where the binocular vision suitability determination unit determines that the object image in the first guide frame is suitable for the binocular vision, the display control unit matches at least one of a position and size of the first guide frame to the object image suitable for the binocular vision. Here, the display of a dynamic picture image in the display unit is not especially limited in the case of three-dimensional display (stereoscopic display), and includes the case of two-dimensional display (plane display).

According to this configuration, it is possible to reduce and suppress failure pictures of a stereoscopic image, and, furthermore, the user can easily confirm where to look in the display unit, by assist in a guide frame, and easily and visually confirm whether it is suitable for binocular vision. Moreover, to realize this image pickup apparatus, since it does not have to add a new part to an image pickup apparatus in the related art, the cost suppression effect is also acquired.

According to one aspect, the display control unit displays a second guide frame of a larger size than the first guide frame on the display unit in addition to the first guide frame, and, in a case where the object image detection unit detects at least one other object image different from the object image determined to be suitable for the binocular vision by the binocular vision suitability determination unit from the second guide frame, the display control unit matches the second guide frame to the at least one other object image.

According to one aspect, the binocular vision suitability determination unit determines whether the at least one other object image in the second guide frame is suitable for the binocular vision, and in a case where the binocular vision suitability determination unit determines that the at least one other object image in the second guide frame is suitable for the binocular vision, the display control unit matches the second guide frame to the at least one other object image suitable for the binocular vision.

According to one aspect, it includes: an image pickup instruction input unit configured to accept an input of an image pickup instruction from a user; and a recording unit configured to record the stereoscopic image acquired by the image pickup unit in a predetermined storage medium when the image pickup instruction is input in the image pickup instruction input unit in a case where the binocular vision suitability determination unit determines that the stereoscopic image is suitable for the binocular vision.

According to one aspect, it further includes: a binocular vision suitability notification unit configured to notify that the stereoscopic image is suitable for the binocular vision in a case where the binocular vision suitability determination unit determines that the stereoscopic image is suitable for the binocular vision; and a recording unit configured to record the stereoscopic image acquired by the image pickup unit in a predetermined storage medium when a certain period of time elapses after the binocular vision suitability notification unit notifies that the stereoscopic image is suitable for the binocular vision. That is, since the shutter is automatically activated, it is possible to mitigate the blur due to the shutter operation.

According to one aspect, the display control unit causes the display unit to perform plane display of one viewpoint image of the multiple viewpoint images, overlaps the guide frame over the one viewpoint image subjected to this plane display and causes the display unit to perform plane display, and, in a case where the binocular vision suitability determination unit determines that the object image is suitable for the binocular vision, causes the display unit to perform stereoscopic display of the stereoscopic image.

According to one aspect, when the number of the object images in the guide frame exceeds a threshold, the binocular vision suitability determination unit determines that the stereoscopic image is not suitable for the binocular vision.

According to one aspect, when a size of the object image in the guide frame is equal to or less than a first threshold or the size of the object image in the guide frame exceeds a second threshold greater than the first threshold, the binocular vision suitability determination unit determines that the stereoscopic image is not suitable for the binocular vision.

According to one aspect, in a case where there are a plurality of the object images in the guide frame, the binocular vision suitability determination unit calculates a difference between a maximum value and minimum value of an object distance in the plurality of the object images as an object distance range, and, in a case where the object distance range is not within an allowable range, determines that it is not suitable for the binocular vision.

According to one aspect, it further includes a binocular vision unsuitability notification unit configured to notify that the stereoscopic image is not suitable for the binocular vision when the binocular vision suitability determination unit determines that the stereoscopic image is not suitable for the binocular vision. That is, it is possible to visually confirm that it is not suitable for binocular vision.

According to one aspect, when the binocular vision suitability determination unit determines that the stereoscopic image is not suitable for the binocular vision, the binocular vision unsuitability notification unit switches display of the display unit from the stereoscopic display to the plane display.

According to one aspect, when the binocular vision suitability determination unit determines that the stereoscopic image is not suitable for the binocular vision, the binocular vision unsuitability notification unit performs control to switch a color of the guide frame displayed on the display unit or control to blink the guide frame.

According to one aspect, when the binocular vision suitability determination unit determines that the stereoscopic image is not suitable for the binocular vision, the binocular vision unsuitability notification unit performs notification using any of a light emitting diode, the display unit and a sound output device as the notification unit.

According to one aspect, it further includes a setting input unit configured to accept an input of at least one setting of whether the guide frame display by the display control unit is performed and the binocular vision suitability determination by the binocular vision suitability determination unit is performed, a type of the object image detected in the object image detection unit and a type of the guide frame displayed on the display unit.

Moreover, an image pickup method according to another aspect of the present invention using an image pickup unit configured to image an object and acquire a stereoscopic image formed with multiple viewpoint images and a display unit capable of displaying the stereoscopic image acquired by the image pickup unit, includes: a guide frame display step of displaying a guide frame of a predetermined size on the display unit; an object image detection step of detecting a specific object image from the stereoscopic image acquired by the image pickup unit; a distance information acquisition step of acquiring information which relates to a distance of an object corresponding to the object image detected in the object image detection step and relates to a distance from the image pickup unit to the object; a binocular vision suitability determination step of determining whether the object image in the guide frame is suitable for binocular vision, based on the information which relates to the distance acquired in the distance information acquisition step, and a step of matching at least one of a position and size of the guide frame to the object image suitable for the binocular vision in a case where it is determined that the object image in the guide frame is suitable for the binocular vision in the binocular vision suitability determination step.

Even by this image pickup method, the user can easily confirm where to look in the display unit, by assist in a guide frame, and easily and visually confirm whether it is suitable for binocular vision.

Moreover, according to another aspect of the present invention, there is provided a program that causes a processor (for example, a processor mounted on the image pickup apparatus) to execute the image pickup method. By causing the processor to execute the program according to the present invention, it is possible to achieve the effect similar to the image pickup method. Moreover, according to another aspect of the present invention, there is provided a non-transitory computer-readable medium in which a program that causes a processor to execute the image pickup method is recorded. By causing the processor to read out the program from the storage medium according to the present invention and execute it, it is possible to achieve the effect similar to the image pickup method.

According to the present invention, it is possible to visually assist the user to be able to easily take a stereoscopic image with a proper parallax.

BRIEF DESCRIPTION OF THE DRAWINGS

FIG. 12 is a flowchart illustrating a flow of an image pickup processing example in the fourth embodiment.

DETAILED DESCRIPTION OF THE PREFERRED EMBODIMENTS

In the following, embodiments of the present invention are described in detail with reference to the accompanying drawings.

Figure 1:
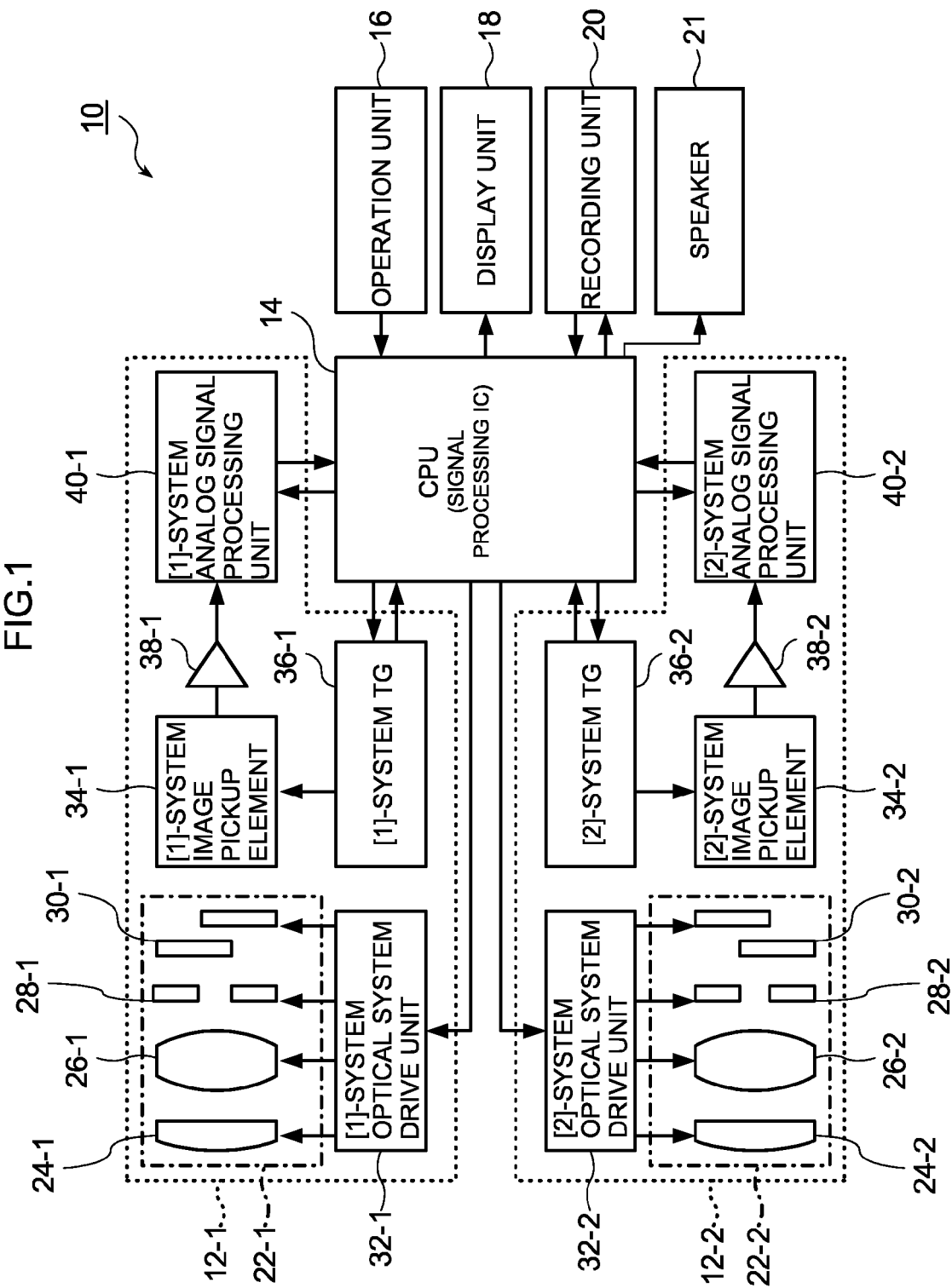
FIG. 1 is an entire configuration diagram of one example of an image pickup apparatus according to the present invention.

FIG. 1 is the entire configuration diagram of one example of an image pickup apparatus according to the present invention.

An image pickup apparatus 10 of the present example includes two image pickup units 12-1 and 12-2. Here, two or more image pickup units 12 may be installed.

The image pickup units 12-1 and 12-2 take an image of an object and acquire a stereoscopic image formed with multiple viewpoint images.

A CPU (Central Processing Unit) 14 is a control device that performs integral control of the entire operation of the image pickup apparatus 10 according to a program.

The CPU 14 of the present example is formed with a signal processing IC. This signal processing IC includes a ROM (Read Only Memory), an EPROM (Erasable Programmable ROM) and a work memory (RAM (Random Access Memory)). A control program executed by the CPU 14 and various kinds of data required for control, and so on, are stored in the ROM. Various kinds of setting information related to the operation of the image pickup apparatus 10 such as user setting information is stored in the EPROM, and a nonvolatile memory from which the storage content is not deleted even if it is powered off, is used as the EEPROM. The work memory includes a calculation work area of the CPU 14 and a temporary storage area of image data, and a dynamic RAM that is a volatile memory is usually used in terms of cost performance.

Figure 2:
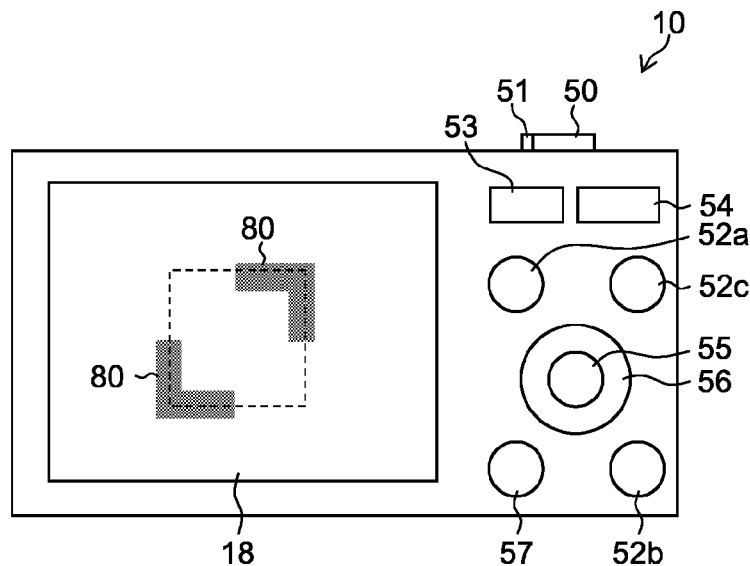
FIG. 2 is a back view of the main body of an image pickup apparatus.

An operation unit 16 is an operation device that accepts a user's instruction input. FIG. 2 illustrates the back of the main body of the image pickup apparatus 10 in FIG. 1. As illustrated in FIG. 2, in the back of the main body of the image pickup apparatus 10, as components of the operation unit 16, there are arranged: a release switch 50 that accepts an input of an image pickup instruction; a zoom lever 51 that accepts an input of a zooming instruction; mode switches 52a, 52b and 52c that accept an input of an operation mode switching instruction; an LED (Light-Emitting Diode) 53 that can emit light in various colors; a parallax adjustment button 54 that accepts an instruction input of parallax adjustment; a 3D/2D switching button 54 that accepts an input of a switching instruction of a 3D (three-dimensional) image pickup mode and a 2D (two-dimensional) image pickup mode; a MENU/OK button 55 that accepts an input of a menu display instruction or the like; a cross button 56 that accepts an instruction input of four directions of the right, left, top and button; and a DISP/OK button 57 that accepts an instruction input such as a display instruction. Moreover, on the front of the main body of the image pickup apparatus 10, there is arranged a power source switch that accepts an input of a switching instruction of power-on/power-off of the image pickup apparatus 10.

The mode switches 52a, 52b and 52c are operation means for performing a switching input of the operation mode of the image pickup apparatus 10. In the present example, the mode switches are formed including: an imaging/playback switching button 52a that accepts an input of a switching instruction of a playback mode and an image pickup mode (a 2D image pickup mode and a 3D image pickup mode); a 3D/2D switching button 52b that accepts an input of a switching instruction of the 3D image pickup mode and the 2D image pickup mode; and a moving/still image switching button 52c that accepts an input of a switching instruction of moving-image imaging and still-image imaging.

The release switch 50 is formed with a switch of a two-stage stroke type including so-called "half press" and "full press". When the release switch 50 is pressed halfway at the time of the mode to take a still image (S1 ON), image pickup preparation processing (for example, AE (Automatic Exposure) adjustment processing), AF (Auto Focus) processing and AWB (Automatic White Balance) adjustment processing are performed. Further, when the release switch 50 is fully pressed (S2 ON), image pickup and recording processing of still images are performed. Further, at the time of the mode to take a moving image, the image pickup of a moving image is started when the release switch 50 is fully pressed, and the image pickup of the moving image is terminated when it is fully pressed again. Here, a release switch for image pickup of still images and a release switch for image pickup of moving images may be separately installed.

Moreover, a zoom lever 51 is installed in the outer periphery of the release switch 50. The zoom lever 51 is operation means for performing zooming operation of the image pickup units 12-1 and 12-2, and can input a zooming instruction to the telephoto side and a zooming instruction to the wide angle side.

A display unit 18 is, for example, a display apparatus including a color LCD (Liquid Crystal Display). The display unit 18 functions as a display unit that displays a taken image, and functions as a user interface when the setting related to various functions of the image pickup apparatus 10 is performed. Moreover, the display unit 18 functions as an electronic finder that displays a live view image (moving image) to confirm the angle of view at the time of the image pickup mode.

The display unit 18 is a display device that can perform stereoscopic display of the stereoscopic images acquired by the image pickup units 12-1 and 12-2. The display unit 18 of the present example has a function to display a stereoscopic (3D) image which the user or observer can stereoscopically view at the time of the 3D image pickup mode. As a display system of 3D images, for example, a light direction control system is adopted. The light direction control system repeats processing to display image data for the left eye on an LCD and irradiate illumination light that gives the directivity to reach the user's left eye by a back light panel, and processing to display image data for the right eye on an LCD and irradiate illumination light that gives the directivity to reach the user's right eye by a back light panel, alternately (for example, at ⅟60 second intervals). By this means, since the left-eye image and the right-eye image which mutually have parallaxes can be alternately observed by the user's right and left eyes, the user can observe a stereoscopic image. There are many methods to display a stereoscopic image, and any of them can be used.

A recording unit 20 records a taken image file and various kinds of data. For example, the recording unit 20 may be a detachable recording medium such as an SD memory card (registered trademark) and an xD picture card (registered trademark), or a memory built into the main body of the image pickup apparatus 10. However, in a case where the memory built into the main body of the image pickup apparatus 10 is used, it is necessary to use a nonvolatile memory such that an image is not deleted even in a case where the power supply of the camera main body is turned off.

A speaker 21 is a sound output device that performs a sound output.

Next, the image pickup function of the image pickup apparatus 10 is described. Here, although reference numerals "1" and "2" are assigned to the image pickup units 12-1 and 12-2 and distinguished in FIG. 1, since the function of each unit is substantially similar, the hyphen and subsequent reference numerals "1" and "2" are arbitrarily omitted and described in the following explanation.

Each image pickup unit 12 has an image pickup lens (imaging lens) 22 including a focus lens 24, a zoom lens 26, a diaphragm 28 and a mechanical shutter 30. In the present embodiment, convergence angle θc of the image pickup lenses 22-1 and 22-2 is fixed.

The focus lens 24 and the zoom lens 26 move back and forth along the optical axis of each image pickup unit 12. The CPU 14 controls the operation of a focus actuator installed in an optical system drive unit 32, adjusts the position of the focus lens 24 and performs focusing. Moreover, the CPU 14 controls the operation of a zoom actuator installed in the optical system drive unit 32, adjusts the position of the zoom lens 26 and performs zooming. Moreover, by controlling the drive of a diaphragm actuator installed in the optical system drive unit 32, the CPU 14 adjusts the opening amount (diaphragm value) of the diaphragm 28 and controls the incident ray volume to an image pickup element 34.

The mechanical shutter 30 is closed when data is read out from the image pickup element 34. By this means, the light that enters into the image pickup element 34 at the time of the data readout is blocked.

The CPU 14 drives and synchronizes the image pickup lenses 22-1 and 22-1 of the image pickup units 12-1 and 12-2 (that is, focus lenses 24-1 and 24-2, zoom lenses 26-1 and 26-2 and diaphragms 28-1 and 28-2) at the time of the 3D image pickup mode. That is, the image pickup units 12-1 and 12-2 are always set to the same focal distance (zoom magnification) at the time of the 3D image pickup mode and the diaphragms are adjusted to always provide the same incident ray volume (diaphragm value). Further, at the time of the 3D image pickup mode, focus adjustment is performed such that the same object is always focused.

The image pickup element 34 is, for example, a CMOS (Complementary Metal Oxide Semiconductor) image sensor. Here, it is possible to use other image pickup elements than the CMOS image sensor as the image pickup element 34. For example, there is a CCD (Charge Coupled Device) image sensor.

Many photodiodes are two-dimensionally arranged on the light receiving surface of the image pickup element 34. In each photodiode, color filters of predetermined colors (for example, three primary colors of red (R), green (G) and blue (B)) are arranged in a predetermined array. Here, the colors of the color filters are not limited to three primary colors of R, G and B, and, for example, it is also possible to use a color filter of a complementary system. When the object light is formed on the light receiving surface of the image pickup element 34 by the image pickup unit 12, this object light is converted into a signal charge corresponding to the incident ray volume by the photodiode. The image pickup element 34 includes an electronic shutter function, and the CPU 14 controls the exposure time (shutter speed) by controlling the charge storage time to the photodiode. The signal charge accumulated in each photodiode is sequentially read out from the image pickup element 34 as image signals (R, G and B signals) corresponding to the charge amount, on the basis of a drive pulse given from a timing generator (TG) 36 according to an instruction of the CPU 14. The image signal read out from the image pickup element 34 is input in an analog signal processing unit 40 through an amplifier 38.

The analog signal processing unit 40 includes a CDS (Correlated Double Sampling) circuit to remove the reset noise (low frequency) included in the R, G and B signals output from the image pickup element 34, an AGC (Automatic Gain Control) circuit to amplify and control the R, G and B signals to constant level magnitude, and an A/D converter that converts an analog signal into a digital signal. The analog R, G and B signals output from the image pickup element 34 are subjected to correlation double sampling processing and amplified by the analog signal processing unit 40. The amplification gain of the R, G and B signals in the analog signal processing unit 40 corresponds to the imaging sensibility (ISO sensibility). The CPU 14 sets the imaging sensibility by adjusting this amplification gain according to the brightness of the object, and so on. Here, in a case where two image pickup elements with the same sensibility are used to take an image (3D image pickup mode), this gain is set to the same value between a [1]-system analog signal processing unit 40-1 and a [2]-system analog signal processing unit 40-2.

The analog R, G and B signals subjected to gain adjustment are converted into digital R, G and B signals by the A/D converter and thereafter input in a signal processing IC 14 through a buffer memory.

The digital R, G and B signals generated as above are subjected to predetermined processing (for example, processing to compensate the special gap of color signals due to the color filter array of a single image pickup element and produce R, G and B color signals), white balance adjustment processing, gradation conversion (gamma correction) processing and contour correction processing by the signal processing IC and converted into the luminance signal (Y signal) and the color-difference signal (Cr and Cb signals), that is, the Y/C signal.

In a case where a live view image (through image) that is an image to confirm the angle of view in the case of taking a still picture or moving image is displayed on the display unit 18, the image signals accumulated in the image pickup element 34 are thinned and read at predetermined time intervals. The read image signals are subjected to predetermined processing by the signal processing IC and converted into the Y/C signal. Further, this Y/C signal is converted into a signal (for example, R, G and B signals) suitable for display in the display unit 18 and thereafter output to the display unit 18 by one frame each. By this means, a moving image (through image) for confirming the angle of view is displayed on the display unit 18. At the time of the 2D image pickup mode, image signals for a through image are read out only from one image pickup unit 12. On the other hand, at the time of the 3D image pickup mode, image signals for a through image are read out from both of the right and left image pickup units 12-1 and 12-2, and the 3D through image (moving image) is displayed using the both images.

Here, at the time of the 3D image pickup mode, it is possible to display the through image by 2D display according to the setting. In this case, a through image produced using an image acquired from one of the right and left image pickup units 12-1 and 12-2 is displayed. In a case where the object is detected (face detection) at the time of the 3D image pickup mode, it may be possible to change the color of a figure (for example, face detection frame) assigned to the object detected from the above-mentioned 2D through image, according to whether the object is in a proper binocular vision range.

Next, image pickup and recording processing of an image are described. At the time of the 2D image pickup mode, an image for recording is taken by one predetermined image pickup unit (for example, 12-1). Here, it may be possible to make the characteristics of the image pickup units 12-1 and 12-2 (such as the image pickup lens 22 and the image pickup element 34) mutually different such that the user can select which of the image pickup units is used at the time of the 2D image pickup mode.

At the time of the 2D image pickup mode, an image taken by the image pickup unit 12-1 is compressed by the signal processing IC. The compressed image data is recorded in the recording unit 20 as an image file of a format. For example, a still image is recorded as a compression image file in conformity with the standard of JPEG (Joint Photographic Experts Group) and a moving image is recorded as a compression image file in conformity with the standard of MPEG2, MPEG4 or H.264, and so on. However, the compression scheme is not limited to these.

At the time of the 3D image pickup mode, images are synchronously taken by the image pickup units 12-1 and 12-2. At the time of the above-mentioned 3D image pickup mode, AF processing and AE processing are performed on the basis of an image signal acquired by one of the image pickup units 12-1 and 12-2. At the time of the above-mentioned 3D image pickup mode, the images at two viewpoints taken by the image pickup units 12-1 and 12-2 are compressed, stored as one file and recorded in the recording unit 20. The file stores the compression image data of two viewpoints together with object distance information and information on the interval and convergence angle of the image pickup lens of the image pickup unit 12.

At the time of a playback mode, the final image file (image file recorded last time) recorded in the recording unit 20 is read out and expanded to a non-compression Y/C signal by the signal processing IC. This non-compression Y/C signal is converted into R, G and B signals and thereafter output to the display unit 18. By this means, the image file recorded in the recording unit 20 is displayed on the display unit 18.

When an image taken in the 3D image pickup mode is played, it is possible to select 3D displays and 2D displays by the setting. In the case of detecting the object in the image (face detection), it may be possible to change the color of a figure (for example, face detection frame) assigned to the object detected from the above-mentioned 2D display, according to whether the object is in a proper binocular vision range at the time of image pickup.

Figure 3:
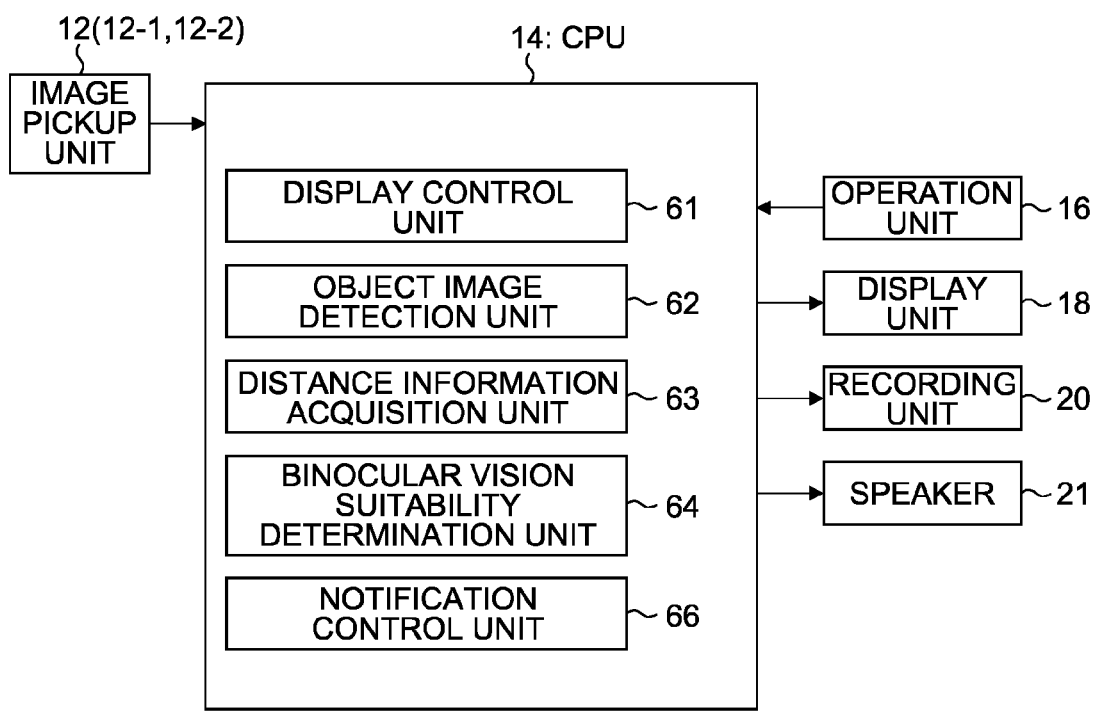
FIG. 3 is a block diagram illustrating a functional configuration of an image pickup apparatus.

Next, a functional configuration of the image pickup apparatus 10 illustrated in FIG. 1 is described using FIG. 3.

As illustrated in FIG. 3, the CPU 14 includes: a display control unit 61 that displays a guide frame (main guide frame and sub-guide frame) of a predetermined size on the display unit 18; an object image detection unit 62 that detects a specific object image from a stereoscopic image acquired by the image pickup unit 12; a distance information acquisition unit 63 that acquires information which relates to a distance of an object corresponding to the object image detected by the object image detection unit 62 and which relates to the distance from the image pickup unit 12 to the object (which may be simply referred to as "distance information" below); a binocular vision suitability determination unit 64 that determines whether a stereoscopic image is suitable for binocular vision by determining whether the object image in the guide frame is suitable for binocular vision, on the basis of the distance information acquired by the distance information acquisition unit 63; and a notification control unit 66 (binocular vision suitability notification control unit and binocular vision unsuitability notification control unit) that notifies that the stereoscopic image is suitable for binocular vision and the stereoscopic image is not suitable for binocular vision. In a case where the binocular vision suitability determination unit 64 determines that the object image in the guide frame is suitable for binocular vision, the display control unit 61 adjusts at least any one of the guide frame position and the size to the object image suitable for binocular vision.

Here, "specific object image" is an image of an object detected from the stereoscopic image by the object image detection unit 62 in the present embodiment. As for a concrete example of "specific object image", although a facial image is provided as a representative example, other objects (object image) than the facial image or an object image having a high-frequency component (edge) equal to or greater than a threshold is possible.

Moreover, "information which relates to the distance" is not limited to a numerical value (object distance) that directly shows the distance from the image pickup unit 12 to the object. For example, "information which relates to the distance" may be information acquired by focus control of the focus lens 24 of the image pickup unit 12 by the CPU 14, or information acquired from a parallax map generated by the CPU 14 on the basis of multiple viewpoint images forming the stereoscopic image. The parallax map is acquired by detecting the corresponding point of each pixel between multiple viewpoint images.

"Guide frame" is display showing a predetermined area in the image. Here, "guide frame" is not limited to the example described in the present specification.

For example, the display control unit 61, the object image detection unit 62, the distance information acquisition unit 63, the binocular vision suitability determination unit 64 and the notification control unit 66 are formed with a microcomputer device and an electronic circuit.

Next, the binocular vision suitability determination performed by the binocular vision suitability determination unit 64 is described. In the following, a range in which the parallax of an object image in a stereoscopic image is suitable for binocular vision is referred to as "proper binocular vision range".

Figure 4:
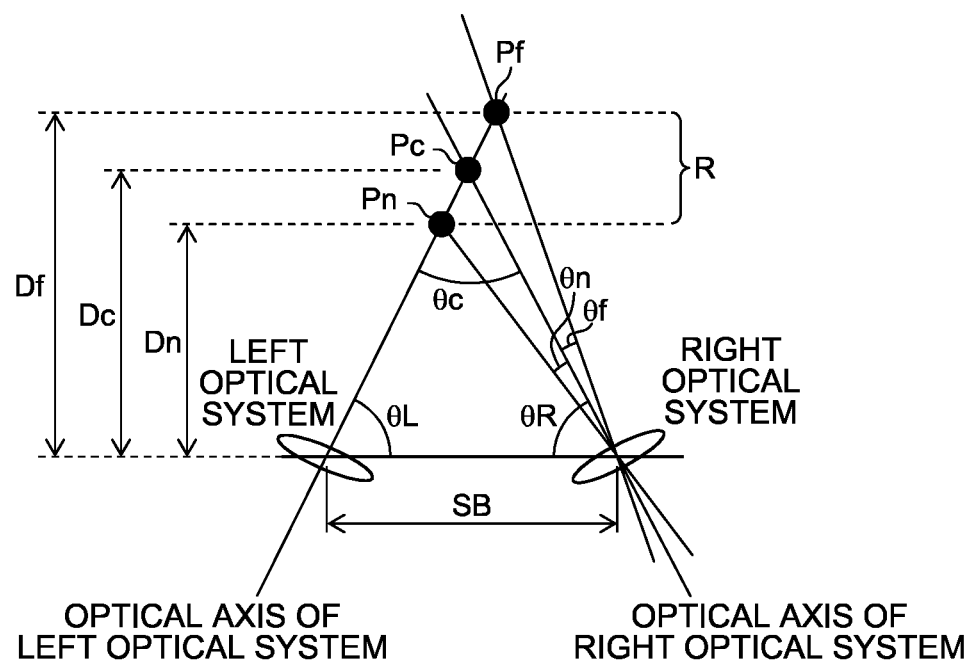
FIG. 4 is an explanatory diagram used to describe a proper binocular vision range.

A calculation example of the proper binocular vision range is described using FIG. 4. In FIG. 4, SB denotes the base length (stereo base), Pc denotes a cross point, Pn denotes the nearest point (hereafter referred to as "near point") in proper binocular vision range R, Pf denotes the furthest point (hereafter referred to as "far point") in proper binocular vision range R, and θc denotes the angle of cross point Pc (hereafter referred to as "convergence angle"), which is the angle formed by the optical axis of a left optical system and the optical axis of a right optical system in FIG. 4. θf and θn are angles that define an allowable parallax amount. That is, proper binocular vision range R denotes a range between distance Dn from the front surface of the main body of the image pickup apparatus 1 (which is a reference surface in which the image pickup unit 12 is arranged) to near point Pn and distance Df from the front surface of the main body of the image pickup apparatus 1 to far point Pf.

To describe a calculation example of proper binocular vision range R briefly, in FIG. 4, an angle showing the optical axis direction of the right optical system (for example, the image pickup lens 22-1 in FIG. 1), that is, an angle formed by the optical axis of the right optical system and SB is assumed to be θR, and an angle showing the optical axis direction of the left optical system (for example, the image pickup lens 22-2 in FIG. 1), that is, an angle formed by the optical axis of the left optical system and SB is assumed to be θL. If θL=90 [degrees] is assumed, distance Dn to near point Pn and distance Df to far point Pf are expressed by the following equation.

$$Dn = SB \times \tan(\theta R - \theta n)$$
$$Df = SB \times \tan(\theta R + \theta f) \quad \text{[Equation 1]}$$

Here, θR=90−θc [degrees] is set in this example. Therefore, Dn−Df showing proper binocular vision range R can be calculated using base length SB, convergence angle θc and angles θf and θn that define an allowable parallax amount, as parameters.

Although an explanation about the calculation of proper binocular vision range R in the case of θL<90 [degrees] is omitted, it only has to calculate Dn and Df showing proper binocular vision range R, using base length SB, convergence angle θc and angles θf and θn that define an allowable parallax amount, as parameters even in the case of θL<90 [degrees].

As illustrated in FIG. 4, determination as to whether a specific object image in a stereoscopic image is suitable for binocular vision can be performed by determining whether the distance from the image pickup unit 12 to the object corresponding to the specific object image is within proper binocular vision range R.

Here, although the proper binocular vision range has been described using the object distance in the real space to facilitate the understanding of the present invention, in a case where the object distance in the real space is used, the determination for binocular vision suitability in the present invention is not especially limited. Any information can be used as long as the information corresponds to the object distance.

First Embodiment

Figure 5:
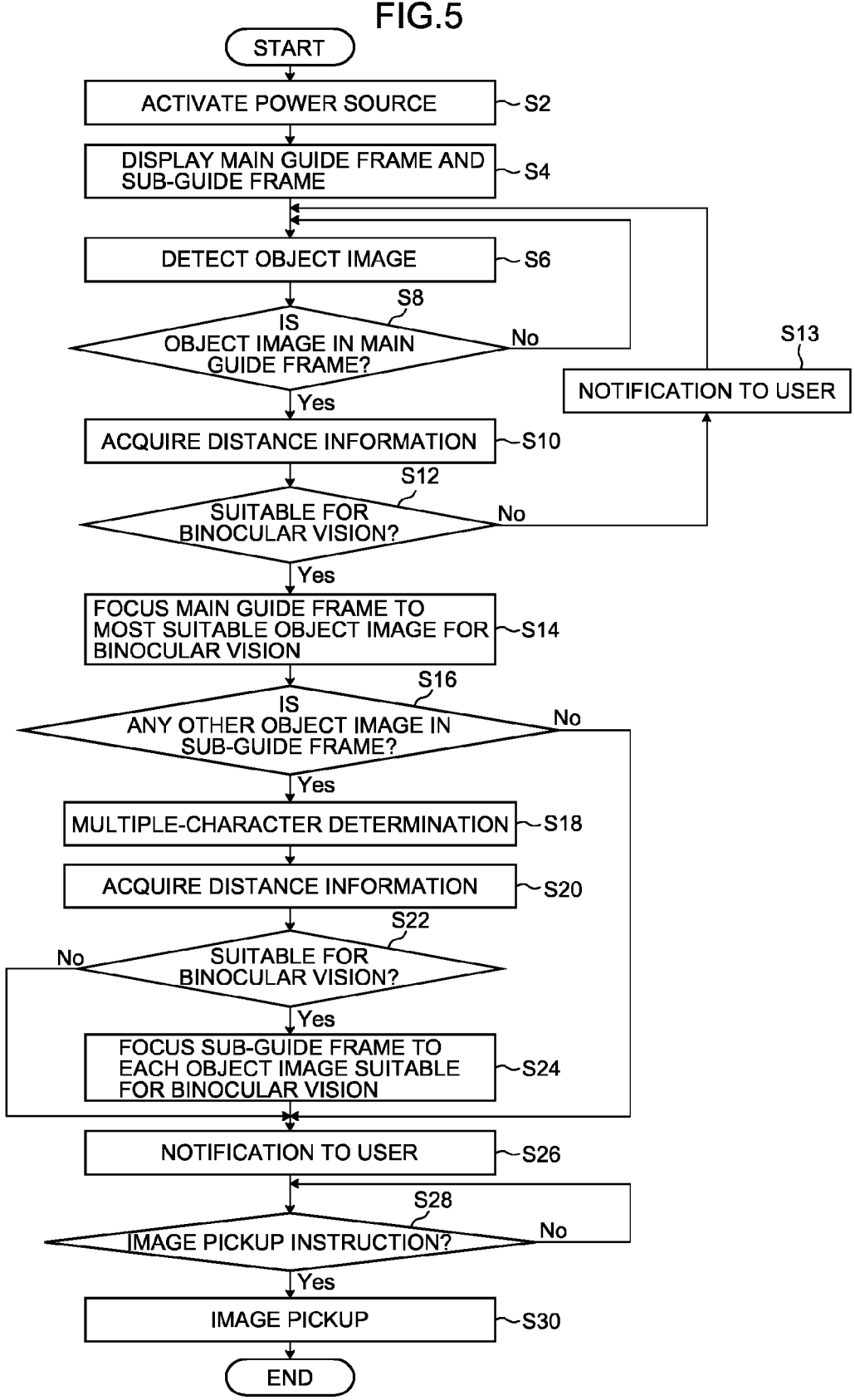
FIG. 5 is a flowchart illustrating a flow of an image pickup processing example in the first embodiment.

FIG. 5 is a flowchart illustrating the flow of an image pickup processing example in the first embodiment, which is a flowchart illustrating the flow of one example of image pickup processing in the image pickup apparatus illustrated in FIGS. 1 to 3. The present processing is performed by the CPU 14 according to a program.

First, power source activation processing is performed (step S2).

Next, a main guide frame of a predetermined size (first guide frame) and a sub-guide frame (second guide frame) are displayed on the display unit 18 (step S4). The size of the sub-guide frame is larger than that of the main guide frame.

Next, the object image detection unit 62 detects a specific object image from a stereoscopic image acquired by the image pickup unit 12 (step S6). In the present example, although a facial image is detected as the specific object image, other object images than the facial image or an object image having a high-frequency component (for example, edge) equal to or greater than a threshold may be detected as the specific object image.

Next, it is determined whether the detected object image is in the main guide frame (step S8). Here, in this example, the main guide frame is displayed overlapping a stereoscopic image, and it is determined whether a specific object image (which is a facial image in the present example) exists in an area shown by the main guide frame in the stereoscopic image.

Next, information on the distance of an object corresponding to the object image detected in the main guide frame (distance information) is acquired by the distance information acquisition unit 63 (step S10). Here, the distance information denotes information corresponding to the distance (object distance) from the image pickup unit 12 to the object, and it does not matter whether it is a value that directly indicates the object distance.

Figure 6:
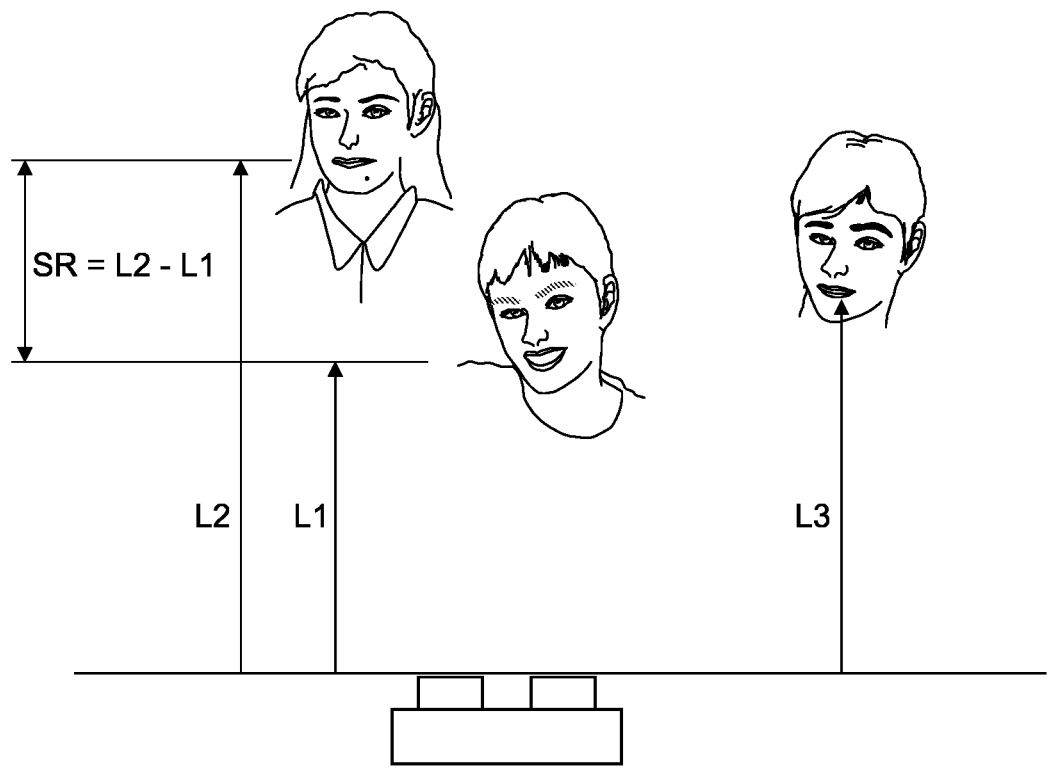
FIG. 6 is an explanatory diagram schematically illustrating one example of an imaging scene in which multiple objects are imaged.

In the example illustrated in FIG. 6, distances L1, L2 and L3 to multiple object images (which are facial images in the present example) are acquired by the distance information acquisition unit 63. The parallaxes of the object images corresponding to these L1, L2 and L3 may be detected from a stereoscopic image by image processing. Information (focus information) acquired by focus control of the focus lens 24 of the image pickup unit 12 may be used or information (parallax information) acquired from the parallax map may be used.

Next, it is determined whether the object images in the main guide frame are suitable for binocular vision, on the basis of the acquired distance information (step S12).

Next, the display control unit 61 focuses the main guide frame to the most suitable object image for binocular vision (hereafter referred to as "optimal object image") (step S14).

Figure 7:
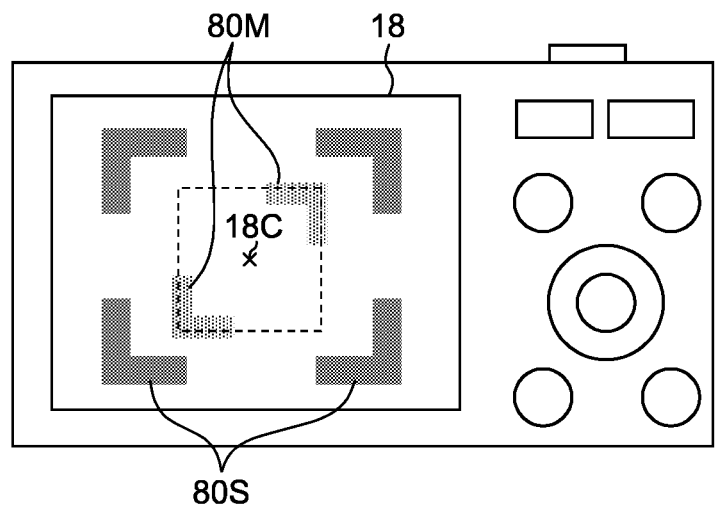
FIG. 7 is an explanatory diagram illustrating a display example of displaying both of a main guide frame and a sub-guide frame.

FIG. 7 illustrates an example where main guide frame 80M and sub-guide frame 80S of a larger size than the main guide frame 80N are displayed on the display unit 18 as a guide frame. In the present example, each of two guide frames (the main guide frame 80M and the sub-guide frame 80S) shows a predetermined area in an image by multiple corner images (two corner images in the main guide frame 80M and four corner images in sub-guide frames 80S in the present example). The center of the main guide frame 80M matches center 18C of the stereoscopic image. That is, the main guide frame 80M is displayed on center 18C of the screen of the display unit 18.

Figure 8A:
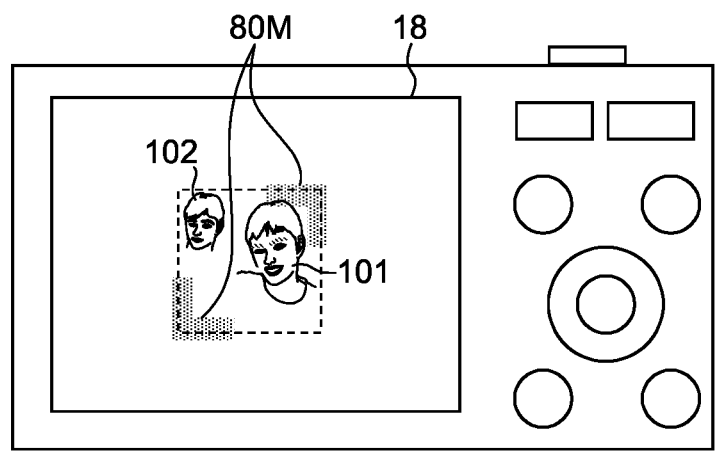
FIG. 8A is an explanatory diagram illustrating a state where a main guide frame is focused on a main object image (version 1).
Figure 8B:
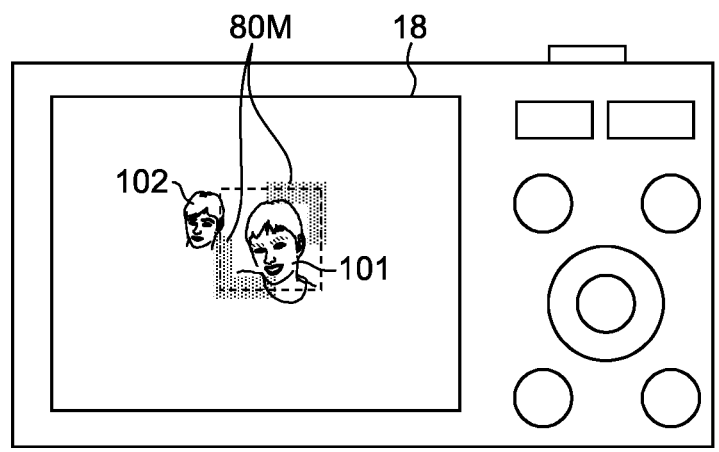
FIG. 8B is an explanatory diagram illustrating a state where a main guide frame is focused on a main object image (version 2).

FIGS. 8A and 8B are diagrams to describe processing in a case where multiple object images are detected in the main guide frame 80M. In FIG. 8A, multiple object images 101 and 102 (which are facial images in the present example) are included in the main guide frame 80M. In a case where the multiple object images 101 and 102 are detected from the main guide frame 80M as illustrated in FIG. 8A, the display control unit 61 selects the most suitable object image for binocular vision from the multiple object images 101 and 102 in the main guide frame 80M, as an optimal object image 101. "Suitable for binocular vision" shows, for example, an object image having the largest parallax among the object images of objects existing in the proper binocular vision range with reference character R illustrated in FIG. 4. In FIG. 4, "the largest parallax" shows an object image corresponding to an object with the largest distance from cross point Pc in proper binocular vision range R. In other words, it is an object image with the largest parallax amount within a range of the allowable parallax amount (a parallax amount range corresponding to θR−θn to θR+θf corresponding to proper binocular vision range R in FIG. 4) among multiple viewpoint images forming a stereoscopic image.

Further, the display control unit 61 performs guide frame focus to match the position and size of the main guide frame 80M to the position and size of the optimal object image 101 (which may be simply referred to as "focus" below). Here, although both of the position and size of the main guide frame 80M are changed in FIG. 8B, there is a case where only one of them is changed.

Next, it is determined whether at least one other object image than the optimal object image 101 (hereafter referred to as "at least one other object image") is in the sub-guide frame 80S (step S16). It proceeds to step S18 in a case where at least one other object image exists in the sub-guide frame 80S, and it proceeds to step S26 in a case where at least one other object image does not exist.

In a case where at least one other object image exists in the sub-guide frame 80S, it is determined whether there are multiple other object images in the sub-guide frame 80S (step S18).

Next, information on the distance of the object corresponding to each object image in the sub-guide frame 80S (distance information) is acquired (step S20). In the present example, the distance from the image pickup unit 12 to the object is calculated. The distance information may be information (focus information) acquired by focus control of the focus lens of the image pickup unit 12 with respect to the object or information (parallax information) acquired from a parallax map generated on the basis of multiple viewpoint images forming a stereoscopic image.

Next, it is determined whether each object image in the sub-guide frame is suitable for binocular vision, on the basis of the acquired distance information (step S22). The determination as to whether the object image in the sub-guide frame is suitable for binocular vision may be performed as well as the determination as to whether the object image in the main guide frame is suitable for binocular vision.

Figure 9A:
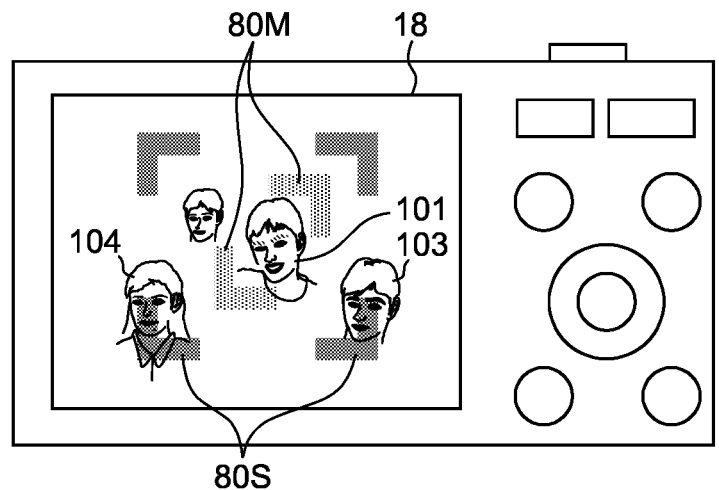
FIG. 9A is an explanatory diagram illustrating a state where a sub-guide frame is focused on multiple sub-object images (version 1).
Figure 9B:
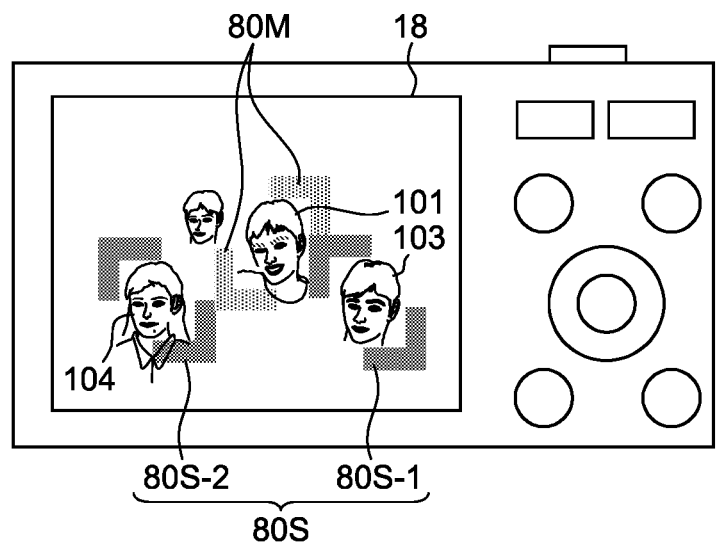
FIG. 9B is an explanatory diagram illustrating a state where a sub-guide frame is focused on multiple sub-object images (version 2).

Next, the sub-guide frame is focused on each object image suitable for binocular vision (step S24). That is, as illustrated in FIGS. 9A and 9B, in a case where object images (103 and 104 in the present example) suitable for binocular vision which are other object images than the optimal object image 101 are detected from the sub-guide frame 80S, the position and size of the sub-guide frame 80S are changed in accordance with the object images 103 and 104. In the example illustrated in FIG. 9B, the sub-guide frame 80S is divided into two of a sub-guide frame 80S-1 matching the position and size to a third object image 103 and a sub-guide frame 80S-2 matching the position and size to a fourth object image 104, and displayed.

Next, the display unit 18 notifies to the user that there is an object image suitable for binocular vision at least in the main guide frame 80M (step S26).

Next, it is determined whether to have accepted an input of an image pickup instruction from the user by the operation unit 16 (step S28).

When the image pickup instruction is input in the operation unit 16, predetermined image processing (signal processing) is performed on the stereoscopic image acquired by the image pickup unit 12 and a stereoscopic image subjected to the image processing is recorded (stored) in a predetermined storage medium by the recording unit 20 (step S30).

In the present embodiment, in a case where the binocular vision suitability determination unit 64 determines that the stereoscopic image is suitable for binocular vision, when the image pickup instruction is input in the operation unit 16 (image pickup instruction input unit), the stereoscopic image acquired by the image pickup unit 12 is recorded in the predetermined storage medium by the recording unit 20.

Here, as for the focus of the main guide frame and the sub-guide frame with respect to object images (display control to match at least one of the position and size of the guide frame to an object image suitable for binocular vision), there are a case to change the frame and a case to display a new frame.

Second Embodiment

Figure 10:
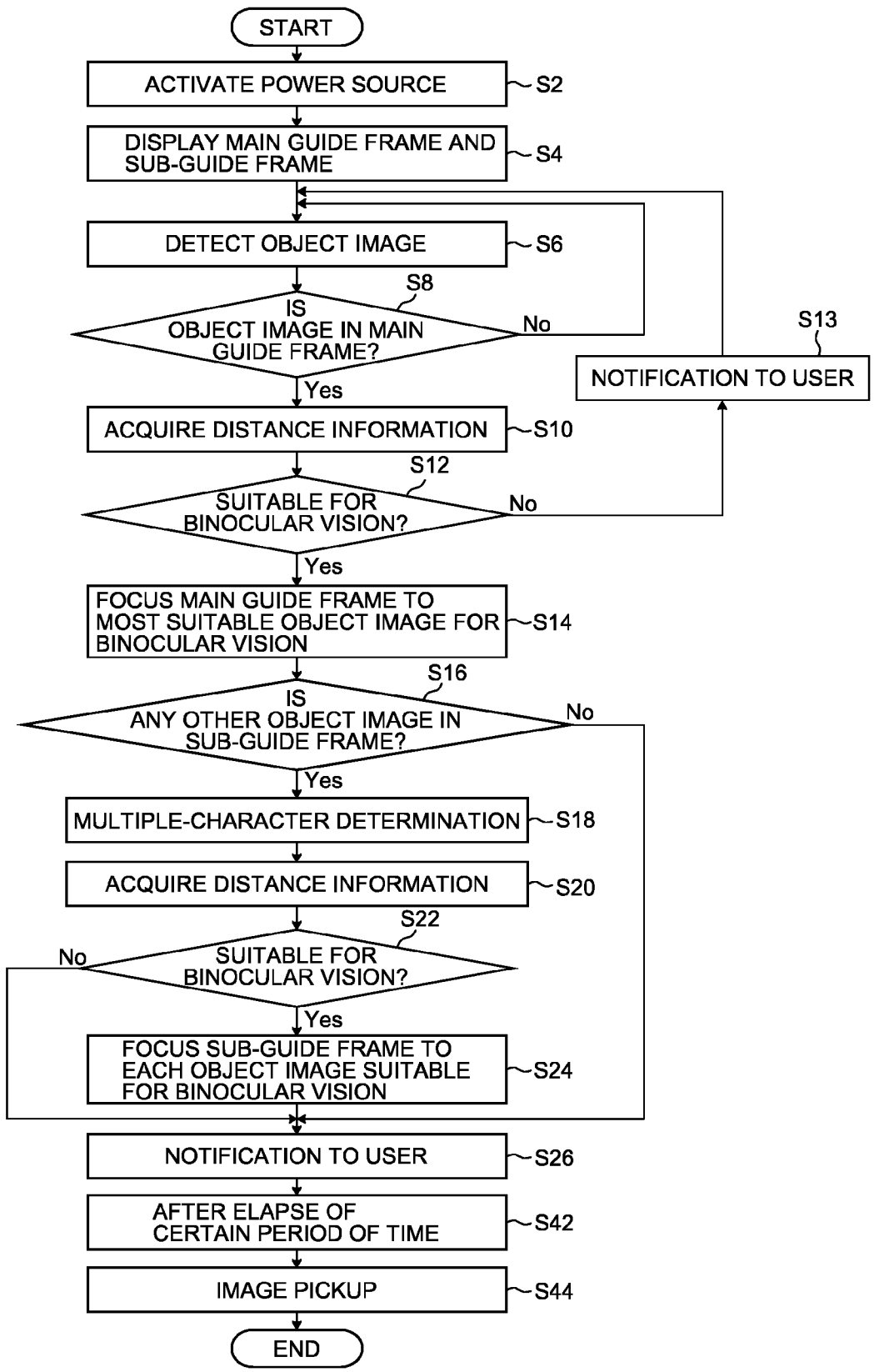
FIG. 10 is a flowchart illustrating a flow of an image pickup processing example in the second embodiment.

FIG. 10 is a flowchart illustrating the flow of an image pickup processing example in the second embodiment. The present processing is performed according to a program by the CPU 14. Here, steps S2 to S26 are similar to the processing in the first embodiment illustrated in FIG. 5 and therefore the explanation is omitted.

In step S42, it is waited that constant time passes.

Step S44 is similar to step S30 in the first embodiment, predetermined image processing is performed on the stereoscopic image acquired by the image pickup unit 12 and the stereoscopic image subjected to the image processing is recorded in a predetermined storage medium by the recording unit 20.

In the present embodiment, in a case where the binocular vision suitability determination unit 64 determines that the stereoscopic image is suitable for binocular vision, when constant time has passed since the display unit 18 (binocular vision suitability notification unit) notified that the stereoscopic image is suitable for binocular vision, the stereoscopic image acquired by the image pickup unit 12 is recorded in a predetermined storage medium by the recording unit 20.

Third Embodiment

Figure 11:
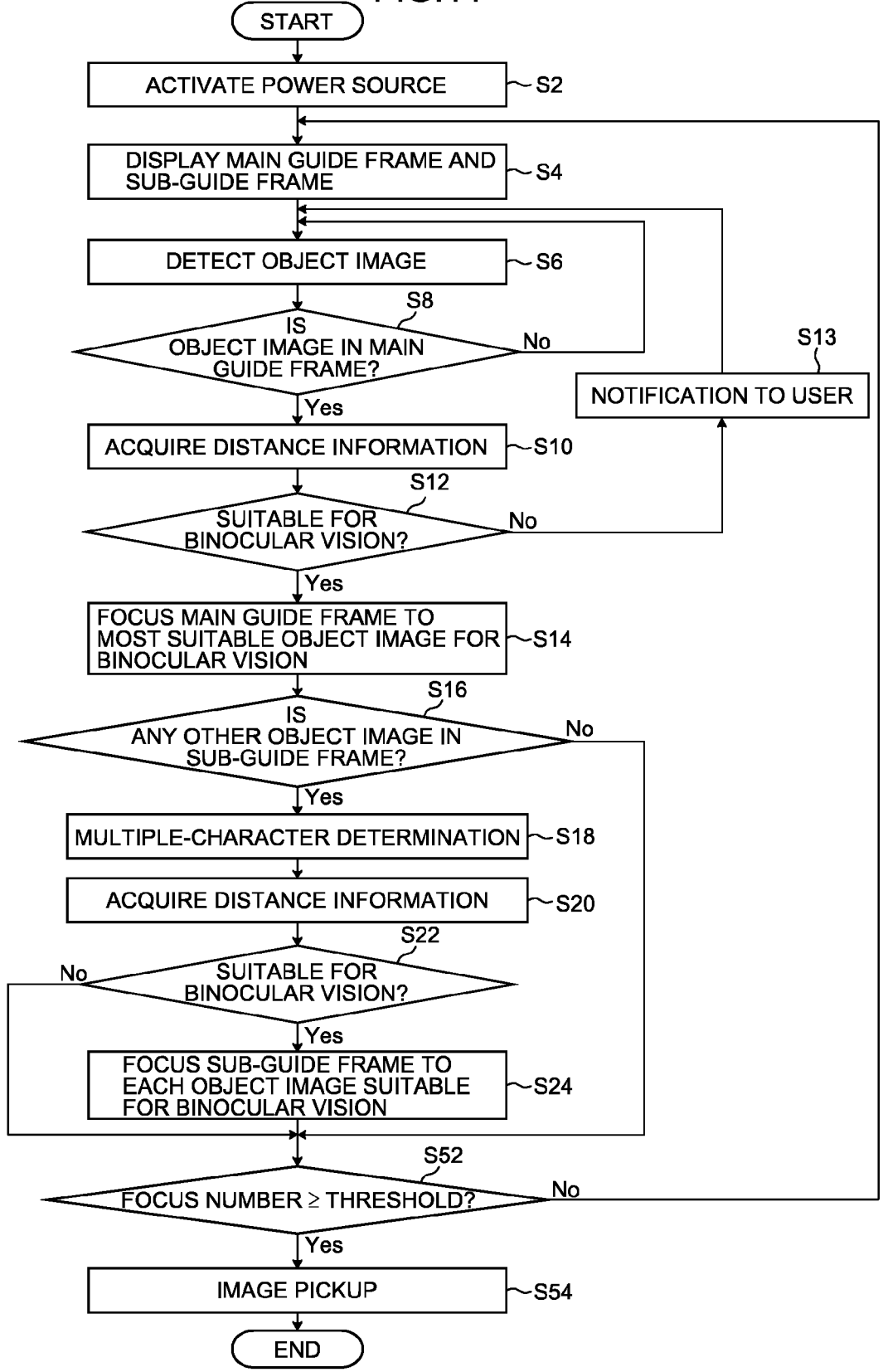
FIG. 11 is a flowchart illustrating a flow of an image pickup processing example in the third embodiment.

FIG. 11 is a flowchart illustrating the flow of an image pickup processing example in the third embodiment. The present processing is performed by the CPU 14 according to a program. Here, steps S2 to S24 are similar to the processing in the first embodiment illustrated in FIG. 5 and therefore the explanation is omitted.

In step S52, the number of object images suitable for binocular vision in the main guide frame and the sub-guide frame is compared with a threshold. It proceeds to step S54 in a case where it is equal to or greater than the threshold, and it returns to step S4 in a case where it is less than the threshold.

In step S54, similar to step S30 in the first embodiment, predetermined image processing is performed on the stereoscopic image acquired by the image pickup unit 12 and the stereoscopic image subjected to the image processing is recorded in a predetermined storage medium by the recording unit 20.

In the present embodiment, in a case where the binocular vision suitability determination unit 64 determines that a stereoscopic image is suitable for binocular vision, when the number of object images suitable for binocular vision in the main guide frame and the sub-guide frame is equal to or greater than a certain number indicated by a threshold, the stereoscopic image acquired by the image pickup unit 12 is recorded in a predetermined storage medium by the recording unit 20.

Fourth Embodiment

In the image pickup apparatus 10 of the fourth embodiment, the initial display state is assumed to 2D display and a guide frame is set on the display unit 18 beforehand, in a case where an object image enters in the guide frame and it is determined that it is suitable for binocular vision, the 2D display (which may be referred to as "two-dimensional display" or "plane display") is switched to 3D display (which may be referred to as "three-dimensional display" or "stereoscopic display"), and, after the user confirms the image, an input of an image pickup instruction of a shutter button is accepted to perform imaging.

FIG. 12 is a flowchart illustrating the flow of an image pickup processing example in the fourth embodiment. The present processing is performed by the CPU 14 according to a program.

After the power source activation processing (step S2), it is determined whether it is a simple multiple-character stereoscopic image pickup mode (step S102).

In a case where it is the simple multiple-character stereoscopic image pickup mode, a through image is displayed by 2D (step S104). That is, the display control unit 61 displays one viewpoint image (the left viewpoint image or the right viewpoint image) on the display unit 18 (plane display) among multiple viewpoint images (the left viewpoint image and the right viewpoint image) acquired by the image pickup units 12-1 and 12-2. Next, steps S4 to S24 are executed. Here, steps S4 to S24 are similar to the processing in the first embodiment illustrated in FIG. 5 and therefore the explanation is omitted herein.

When it is the simple multiple-character stereoscopic image pickup mode, in a state where the through image is displayed by 2D in steps S4 to S24, after the guide frame is displayed, the object image is detected, whether it is suitable for binocular vision is determined and the guide frame is focused, the display is switched to the 3D displays (step S124).

Figure 13A:
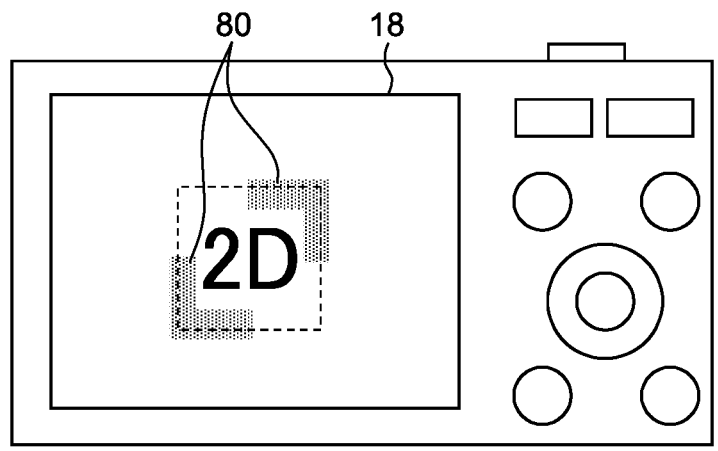
FIG. 13A is an explanatory diagram typically illustrating 2D through image display.

FIG. 13A typically illustrates the 2D display (plane display). That is, in a case where there is an object image in a stereoscopic image, the object image is two-dimensionally displayed. Here, FIG. 13A typically indicates a case where there is an object image in a guide frame 80.

Steps S26 to S30 are similar to the processing in the first embodiment illustrated in FIG. 5 and therefore the explanation is omitted herein.

Figure 13B:
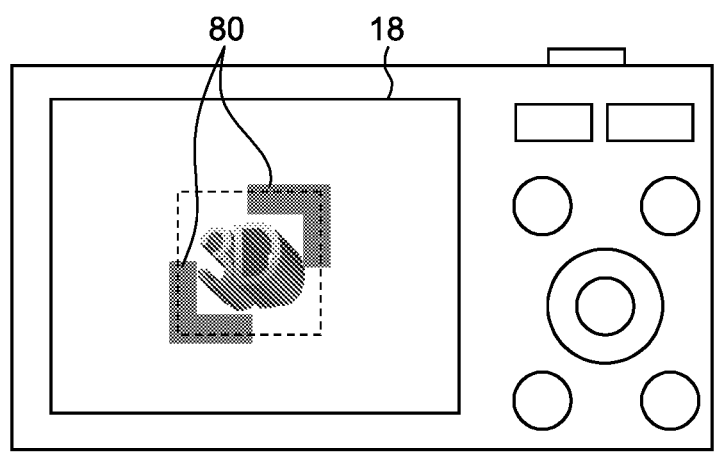
FIG. 13B is an explanatory diagram typically illustrating 3D through image display.

In a case where it is not the simple multiple-character stereoscopic image pickup mode, the through image is displayed by 3D (step S106). That is, the display control unit 61 performs stereoscopic display of the multiple viewpoint images (the left viewpoint image and the right viewpoint image) acquired by the image pickup units 12-1 and 12-2 on the display unit 18. FIG. 13B typically illustrates 3D display (stereoscopic display). That is, in a case where there is an object image in a stereoscopic image, the object image is two-dimensionally displayed. Here, although FIG. 13B illustrates a case where the guide frame 80 is displayed for comparison with FIG. 13A, the guide frame 80 is not displayed in the image pickup processing example illustrated in FIG. 12.

In the present embodiment, the display control unit 61 performs plane display of one viewpoint image on the display unit 18 among multiple viewpoint images first, overlaps a guide frame over one viewpoint image subjected to this plane display and performs plane display, and, in a case where the binocular vision suitability determination unit 64 determines that the object image is suitable for binocular vision, performs three-dimensional display (stereoscopic display) of the stereoscopic image.

Here, although an example has been described in the fourth embodiment where image pickup is performed when it is notified to the user to input an image pickup instruction (steps S26 to S30), the present invention is not limited in such a case. It may be possible to automatically take an image after the elapse of a certain time period from notification to the user like the second embodiment as illustrated in FIG. 10 (steps S26 and S42 to S44 in FIG. 10), or it may be possible to automatically take an image in a case where the focus number in the guide frame is equal to or greater than a threshold like the third embodiment as illustrated in FIG. 11 (steps S52 to S54 in FIG. 11).

Next, various variation functions applicable to the binocular vision suitability determination in the first to fourth embodiments are described.

Figure 14A:
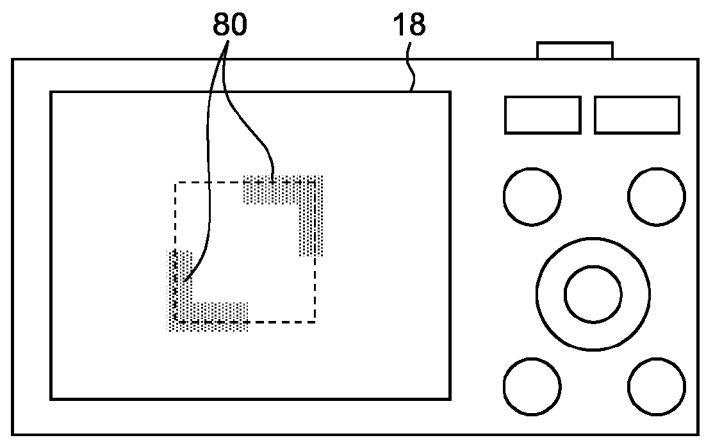
FIG. 14A is an explanatory diagram in a case where the number of object images in a guide frame exceeds a threshold (version 1).
Figure 14B:
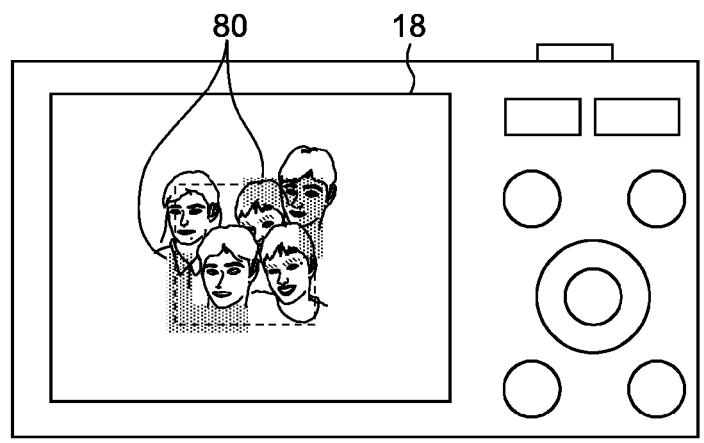
FIG. 14B is an explanatory diagram in a case where the number of object images in a guide frame exceeds a threshold (version 2).
Figure 14C:
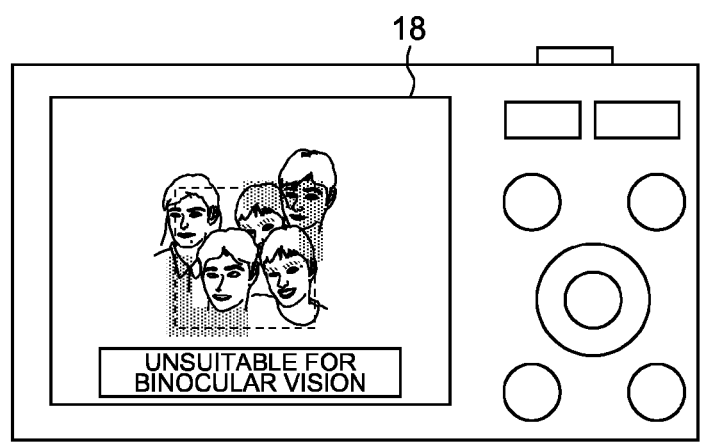
FIG. 14C is an explanatory diagram in a case where the number of object images in a guide frame exceeds a threshold (version 3).

FIGS. 14A to 14C are explanatory diagrams used to describe a function to notify that a stereoscopic image is not suitable for binocular vision when the number of object images in a guide frame exceeds a threshold.

In the present example, the guide frame 80 is displayed on the display unit 18 as illustrated in FIGS. 14A to 14C. Further, the binocular vision suitability determination unit 64 determines whether the number of object images in the guide frame 80 exceeds a threshold, determines that the stereoscopic image is not suitable for binocular vision when the number of object images in the guide frame 80 exceeds the threshold, and causes the display unit 18 to display (notify) a message of "unsuitable for binocular vision".

Figure 15A:
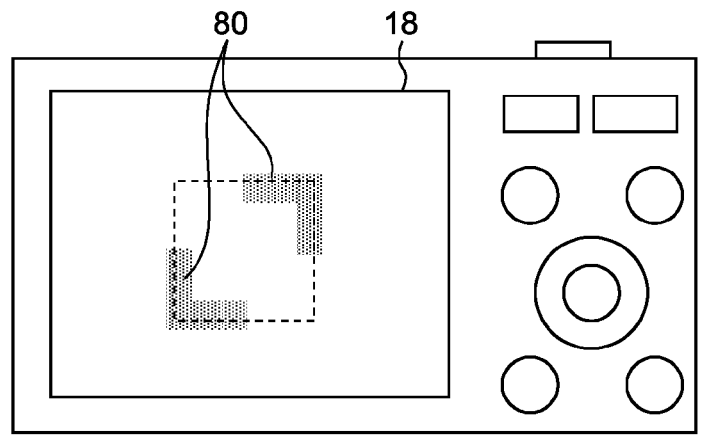
FIG. 15A is an explanatory diagram in a case where the size of an object image in a guide frame is equal to or less than a threshold (version 1).
Figure 15B:
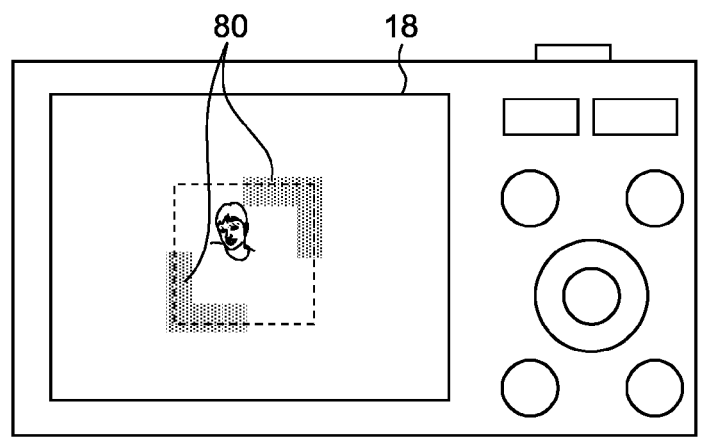
FIG. 15B is an explanatory diagram in a case where the size of an object image in a guide frame is equal to or less than a threshold (version 2).
Figure 15C:
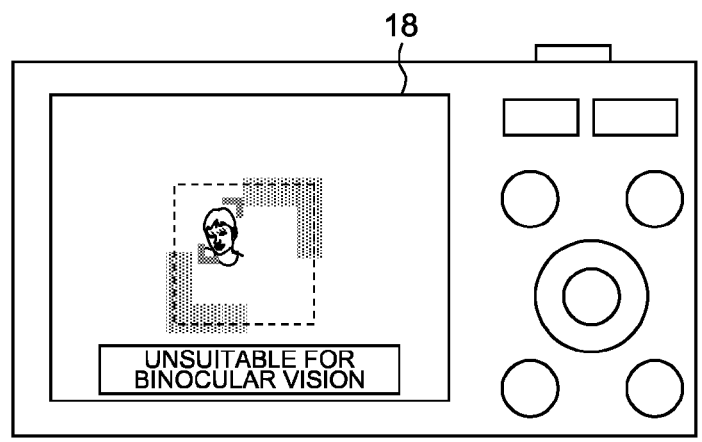
FIG. 15C is an explanatory diagram in a case where the size of an object image in a guide frame is equal to or less than a threshold (version 3).

FIGS. 15A to 15C are explanatory diagrams used to describe a function to notify that a stereoscopic image is not suitable for binocular vision when the size of an object image in a guide frame is equal to or less than a threshold.

In the present example, the guide frame 80 is displayed on the display unit 18 as illustrated in FIGS. 15A to 15C. Further, the binocular vision suitability determination unit 64 determines whether the size of an object image in the guide frame 80 exceeds a threshold, determines that the stereoscopic image is not suitable for binocular vision when the size of the object image in the guide frame 80 is equal to or less than the threshold, and causes the display unit 18 to display (notify) a message of "unsuitable for binocular vision".

Figure 16:
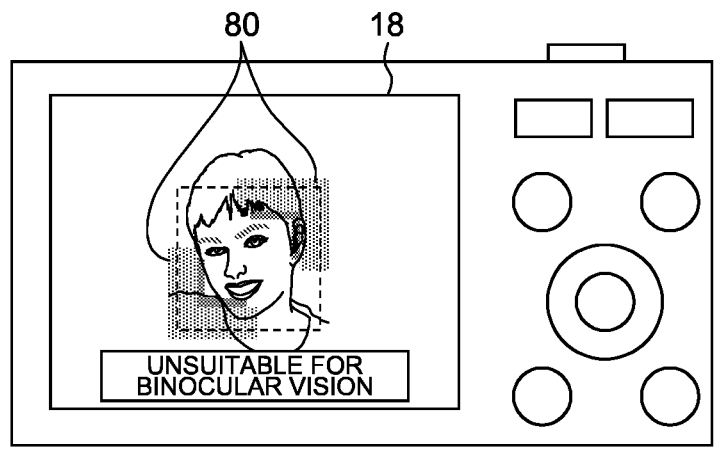
FIG. 16 is an explanatory diagram in a case where the size of an object image in a guide frame exceeds a threshold.

FIG. 16 is an explanatory diagram used to describe a function to notify that a stereoscopic image is not suitable for binocular vision when the size of an object image in a guide frame exceeds a threshold.

In the present example, the guide frame 80 is displayed on the display unit 18. Further, the binocular vision suitability determination unit 64 determines whether the size of an object image in the guide frame 80 exceeds a threshold, determines that the stereoscopic image is not suitable for binocular vision when the size of the object image in the guide frame 80 exceeds the threshold, and causes the display unit 18 to display (notify) a message of "unsuitable for binocular vision" as illustrated in FIG. 16.

Figure 17:
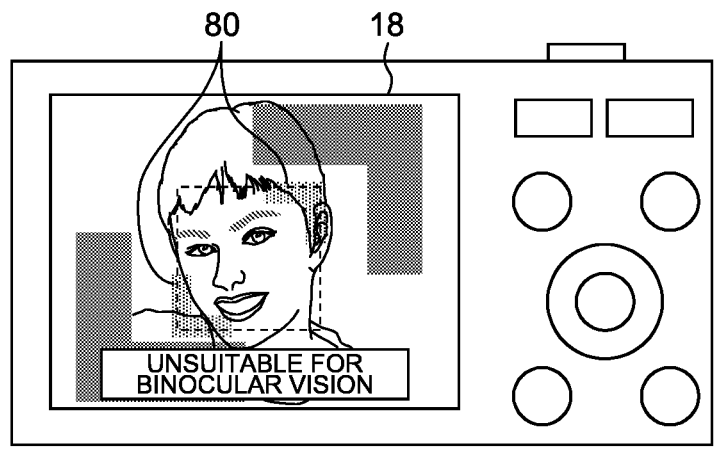
FIG. 17 is an explanatory diagram in a case where an object image of the size over a guide frame is detected.

FIG. 17 is an explanatory diagram used to explain a function to notify that a stereoscopic image is not suitable for binocular vision when an object image of the size over a guide frame is detected.

In the present example, the guide frame 80 is displayed on the display unit 18. Further, the binocular vision suitability determination unit 64 determines whether there is an object image of the size over the guide frame 80, determines that the stereoscopic image is not suitable for binocular vision when there is the object image of the size over the guide frame 80, and causes the display unit 18 to display (notify) a message of "unsuitable for binocular vision" as illustrated in FIG. 17.

Figure 18:
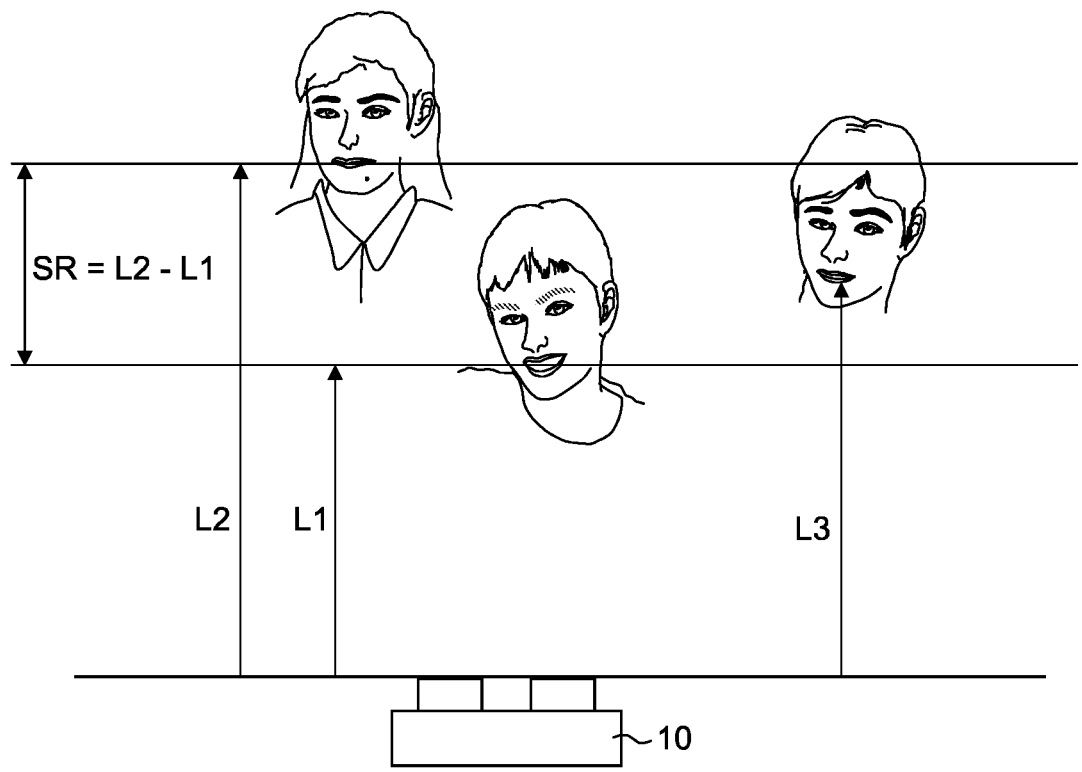
FIG. 18 is an explanatory diagram used to describe an object distance range.

FIG. 18 is an explanatory diagram used to describe a case where binocular vision suitability determination is performed on the basis of an object distance range.

In FIG. 18, L1 denotes the object distance from the image pickup apparatus 10 to the first object, L2 denotes the object distance from the image pickup apparatus 10 to the second object, and L3 denotes the object distance from the image pickup apparatus 10 to the third object. In a case where multiple object images (the object image of the first object, the object image of the second object and the object image of the third object) respectively corresponding the first, second and third objects are in the guide frame 80, difference SR=L1−L2 between the maximum value (L2 in the present example) and the minimum value (L1 in the present example) among object distances L1, L2 and L3 is referred to as "object distance range".

In the present example, it is determined whether a stereoscopic image is suitable for binocular vision, by displaying the guide frame 80 on the display unit 18, calculating an object distance range with respect to object images in a guide frame by the binocular vision suitability determination unit 64 and determining whether that object distance range SR is within a proper allowable range (in proper binocular vision range R, for example).

There are various notification modes with respect to the user in a case where the binocular vision suitability determination unit 64 determines that a stereoscopic image is not suitable for binocular vision. In the following, representative notification modes 1 to 6 are shown.

<Notification Mode 1>

The display of the display unit 18 is switched from the three-dimensional display (stereoscopic display) to the two dimensional display (plane display).

<Notification Mode 2>

The color of the guide frame 80 displayed on the display unit 18 is switched.

<Notification Mode 3>

The guide frame 80 displayed on the display unit 18 is blinked.

<Notification Mode 4>

The LED 53 is blinked or lightened.

<Notification Mode 5>

A character string showing that it is not suitable for binocular vision is displayed on the display unit 18.

<Notification Mode 6>

The voice showing that it is not suitable for binocular vision is output to the speaker 21 (sound output unit).

Figure 19:
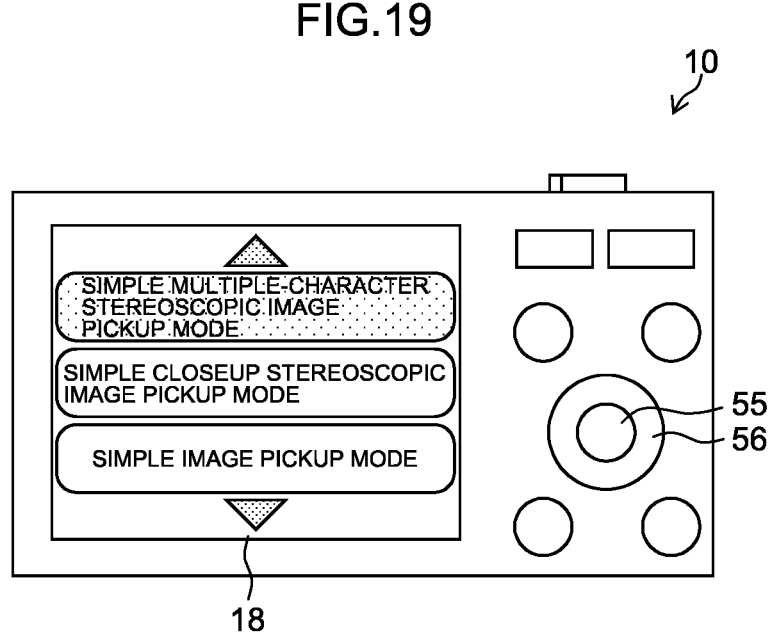
FIG. 19 is an explanatory diagram showing one example of a selection menu of imaging modes.

FIG. 19 is an explanatory diagram used to describe a function to set and input an image pickup mode according to an image pickup scene.

In FIG. 19, the display unit 18 displays a menu to select a simple multiple-character stereoscopic image pickup mode, a simple closeup stereoscopic image pickup mode and a simple image pickup mode and perform an instruction input. The user can select an image pickup mode and perform the instruction input according to an image pickup scene, by the use of the cross button 56 and the MENU/OK button 55 as parts of the operation unit 16.

To be more specific, following selection 1 to selection 3 are possible by performing the instruction input of an image pickup mode by the operation unit 16.

<Selection 1>

Selection as to whether to perform guide frame display and binocular vision suitability determination <Selection 2>

Type of an object image detected in the object image detection unit 62 (whether a person's facial image is detected, and so on)

<Selection 3>

Type of a guide frame displayed on a display unit (whether the sub-guide frame is displayed, and so on)

For example, in the simple multiple-character stereoscopic image pickup mode, the guide frame display and the binocular vision suitability determination are performed and the sub-guide frame is displayed. Moreover, for example, in the simple closeup stereoscopic image pickup mode, another object image than a character image is detected as an object image, and the guide frame display and the binocular vision suitability determination are not performed. Moreover, for example, in the simple image pickup mode, the guide frame display and the binocular vision suitability determination are performed but the sub-guide is not displayed.

Here, although an example case has been described where a dynamic picture image formed with multiple viewpoint images is three-dimensionally displayed (stereoscopic display) by the display unit 18, the present invention is applicable to a case where the dynamic picture image is two-dimensionally displayed (plane display). That is, the image pickup apparatus of the present invention includes an image pickup apparatus that can only two-dimensionally display a dynamic picture image formed with multiple viewpoint images.

The present invention is not limited to the examples described in the present specification and the examples illustrated in the drawings, and it is natural that various design changes and improvements can be performed without departing from the scope of the present invention.

For example, it is also possible to realize the image pickup method described in each embodiment by preparing a program to cause a processor (for example, a processor mounted to the image pickup apparatus) to execute the image pickup method described in each embodiment and causing the processor to execute this program. Moreover, it may be possible to create a storage medium, which can be read out by a processor and which records a program to cause the processor to execute the image pickup method described in each embodiment, and cause the processor to read out and execute the program from this storage medium. Even in this case, it is possible to realize the image pickup method described in each embodiment.

<Variation Example>

Although a case has been described in the above-mentioned embodiments where two image pickup units 12-1 and 12-2 are provided, the present invention is not limited to this case. The present invention is applicable to a case where a stereoscopic image including multiple viewpoint images is taken without depending on the number of image pickup units. In other words, it is also applicable to a case where a stereoscopic image including multiple viewpoint images is taken using one image pickup unit, or it is also applicable to a case where a stereoscopic image including multiple viewpoint images is taken using three or more image pickup units.

What is claimed is:

1. An image pickup apparatus comprising:
   an image pickup unit configured to image an object and acquire a stereoscopic image formed with multiple viewpoint images;
   a display unit capable of displaying the stereoscopic image acquired by the image pickup unit;
   a display control unit configured to display a first guide frame of a predetermined size on the display unit;
   an object image detection unit configured to detect a specific object image from the stereoscopic image acquired by the image pickup unit;
   a distance information acquisition unit configured to acquire information which relates to a distance of an object corresponding to the object image detected by the object image detection unit and relates to a distance from the image pickup unit to the object; and
   a binocular vision suitability determination unit configured to determine whether the object image in the first guide frame is suitable for binocular vision, based on the information which relates to the distance acquired by the distance information acquisition unit,
   wherein, in a case where the binocular vision suitability determination unit determines that the object image in the first guide frame is suitable for the binocular vision, the display control unit matches at least one of a position and size of the first guide frame to the object image suitable for the binocular vision,
   wherein the display control unit displays a second guide frame of a larger size than the first guide frame on the display unit in addition to the first guide frame, and, in a case where the object image detection unit detects at least one other object image different from the object image determined to be suitable for the binocular vision by the binocular vision suitability determination unit from the second guide frame, the display control unit matches the second guide frame to the at least one other object image,
   wherein, in a case where there are a plurality of the object images in the first guide frame, the binocular vision suitability determination unit calculates a difference between a maximum value and minimum value of an object distance in the plurality of the object images as an object distance range, and, in a case where the object distance range is not within an allowable range, determines that the stereoscopic image is not suitable for the binocular vision.

2. The image pickup apparatus according to claim 1, wherein the binocular vision suitability determination unit determines whether the at least one other object image in the second guide frame is suitable for the binocular vision; and
   in a case where the binocular vision suitability determination unit determines that the at least one other object image in the second guide frame is suitable for the binocular vision, the display control unit matches the second guide frame to the at least one other object image suitable for the binocular vision.

3. The image pickup apparatus according to claim 1, further comprising:
   an image pickup instruction input unit configured to accept an input of an image pickup instruction from a user; and
   a recording unit configured to record the stereoscopic image acquired by the image pickup unit in a predetermined storage medium when the image pickup instruction is input in the image pickup instruction input unit in a case where the binocular vision suitability determination unit determines that the stereoscopic image is suitable for the binocular vision.

4. The image pickup apparatus according to claim 1, further comprising:
   a binocular vision suitability notification unit configured to notify that the stereoscopic image is suitable for the binocular vision in a case where the binocular vision suitability determination unit determines that the stereoscopic image is suitable for the binocular vision; and
   a recording unit configured to record the stereoscopic image acquired by the image pickup unit in a predetermined storage medium when a certain period of time elapses after the binocular vision suitability notification unit notifies that the stereoscopic image is suitable for the binocular vision.

5. The image pickup apparatus according to claim 1, further comprising a binocular vision unsuitability notification unit configured to notify that the stereoscopic image is not suitable for the binocular vision when the binocular vision suitability determination unit determines that the stereoscopic image is not suitable for the binocular vision.

6. The image pickup apparatus according to claim 5, wherein, when the binocular vision suitability determination unit determines that the stereoscopic image is not suitable for the binocular vision, the binocular vision unsuitability notification unit switches display of the display unit from the stereoscopic display to the plane display.

7. The image pickup apparatus according to claim 5, wherein, when the binocular vision suitability determination unit determines that the stereoscopic image is not suitable for the binocular vision, the binocular vision unsuitability notification unit performs control to switch a color of the first guide frame displayed on the display unit or control to blink the first guide frame.

8. The image pickup apparatus according to claim 5, wherein, when the binocular vision suitability determination unit determines that the stereoscopic image is not suitable for the binocular vision, the binocular vision unsuitability notification unit performs notification using any of a light emitting diode, the display unit and a sound output device as the notification unit.

9. The image pickup apparatus according to claim 1, further comprising a setting input unit configured to accept an input of at least one setting of whether the first guide frame display by the display control unit is performed and the binocular vision suitability determination by the binocular vision suitability determination unit is performed, a type of the object image detected in the object image detection unit, and a type of the guide frame displayed on the display unit.

10. An image pickup method using an image pickup unit configured to image an object and acquire a stereoscopic image formed with multiple viewpoint images and a display unit capable of displaying the stereoscopic image acquired by the image pickup unit, the method comprising:
   a guide frame display step of displaying a first guide frame of a predetermined size on the display unit;
   an object image detection step of detecting a specific object image from the stereoscopic image acquired by the image pickup unit;
   a distance information acquisition step of acquiring information which relates to a distance of an object corresponding to the object image detected in the object image detection step and relates to a distance from the image pickup unit to the object;
   a binocular vision suitability determination step of determining whether the object image in the first guide frame is suitable for binocular vision, based on the information which relates to the distance acquired in the distance information acquisition step,
   a step of matching at least one of a position and size of the first guide frame to the object image suitable for the binocular vision in a case where it is determined that the object image in the first guide frame is suitable for the binocular vision in the binocular vision suitability determination step, and
   a step of displaying a second guide frame of a larger size than the first guide frame on the display unit in addition to the first guide frame, and, in a case where detecting at least one other object image different from the object image determined to be suitable for the binocular vision from the second guide frame, matching the second guide frame to the at least one other object image, and
   in a case where there are a plurality of the object images in the first guide frame, the binocular vision suitability determination unit calculates a difference between a maximum value and minimum value of an object distance in the plurality of the object images as an object distance range, and, in a case where the object distance range is not within an allowable range, determines that the stereoscopic image is not suitable for the binocular vision.

11. A non-transitory computer-readable medium in which a program that causes a processor to execute an image pickup method according to claim 10 is recorded.

* * * * *